Jan. 2, 1934.   A. E. MARTOIS   1,941,703
CASING CUTTER
Filed July 1, 1930   3 Sheets-Sheet 1

INVENTOR:
ARTHUR E. MARTOIS
BY
ATTORNEY.

Jan. 2, 1934.  A. E. MARTOIS  1,941,703
CASING CUTTER
Filed July 1, 1930  3 Sheets-Sheet 2
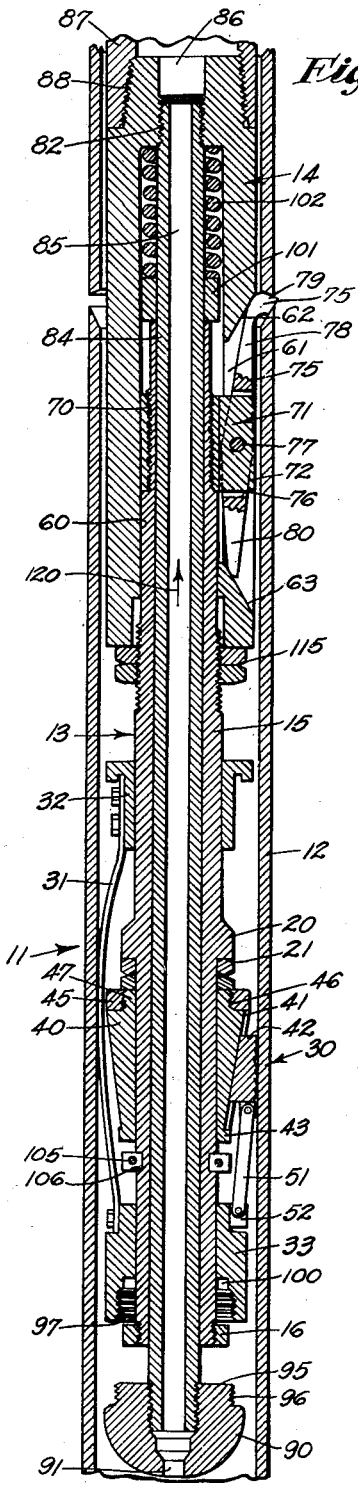
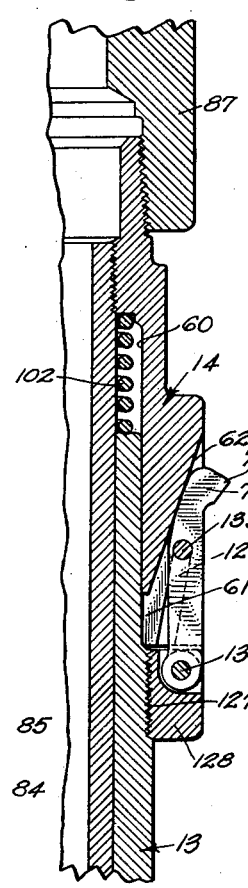
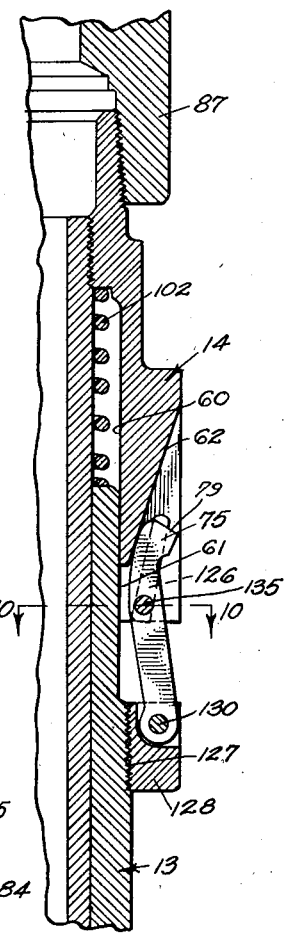
INVENTOR:
ARTHUR E. MARTOIS
BY
ATTORNEY.

Jan. 2, 1934.  A. E. MARTOIS  1,941,703
CASING CUTTER
Filed July 1, 1930  3 Sheets-Sheet 3

INVENTOR:
ARTHUR E. MARTOIS
BY

ATTORNEY.

Patented Jan. 2, 1934

1,941,703

UNITED STATES PATENT OFFICE 1,941,703

CASING CUTTER

Arthur E. Martois, Compton, Calif.

Application July 1, 1930. Serial No. 465,147

14 Claims. (Cl. 81—195)

My invention relates to devices for cutting tubular members, and finds particular utility in the well drilling industry where it is used for cutting well casing in a well.

It is sometimes necessary to remove casing from a well either during drilling operations, in order to straighten a "hole", or after a well has been on production and has become "sanded up". Frequently the casing is found to be "frozen" so that only comparatively short lengths can be moved at one time. It is customary practice to cut the casing above the "freeze" by means of a casing cutter so as to salvage the free portion of the casing, before proceeding to free the casing throughout its entire length.

It is necessary that a casing cutter, adapted to the above described use, be operable from the surface of the ground and it is desirable that only a single string of tubing be used for rotating the casing cutter to sever the casing for the manipulation of moving parts included in the cutter for causing the cutting means to engage the casing, and for causing the cutting means to be retracted into inoperative position after the casing has been cut. I have incorporated these qualities in my device and have been particularly diligent in devising a casing cutter in which all working parts are positive in action and designed for compactness so as to be efficient in smaller sizes. It is in connection with the last mentioned quality that I wish to point out that the manner in which I have designed my novel device enables me to provide a fluid passage throughout the length of the body, which is an important feature, inasmuch as it is necessary to provide lubrication for the cutting means during operation thereof.

It is an object of my invention to provide a casing cutter having means for moving the cutting means into engagement with a casing and means for retracting the cutting means into inoperative position after the casing has been severed.

It is another object of my invention to provide a casing cutter including remotely operable locking means, for locking the device in a casing to be cut, and means for releasing the locking means after the casing has been severed.

It is still another object of my invention to provide a device of the character described having retaining means for retaining the cutting means and the locking means of the device in an inoperative position.

Another object of my invention is to provide a releasing means, operable from the surface of the ground, for releasing the above described retaining means.

It is another and important object of my invention to provide a casing cutter having a body in which there is formed a fluid passage throughout the length thereof for delivering fluid lubrication to the cutting means of the invention carried by the mentioned body.

These and other objects will be apparent from a perusal of the following specification, the accompanying drawings, and the appended claims.

Referring to the drawings in which:

Figs. 1, 2, and 3 are longitudinal sections of my casing cutter taken on a median plane, and respectively showing the working parts of the device in a fully retracted position, an intermediate position, and a fully expanded position.

Figs. 4, 5, and 6 are sectional views taken as indicated by the lines 4—4, 5—5, and 6—6 respectively of Fig. 1.

Figs. 8 and 9 are fragmentary, vertical sections showing an alternative form of my invention.

Figure 1:
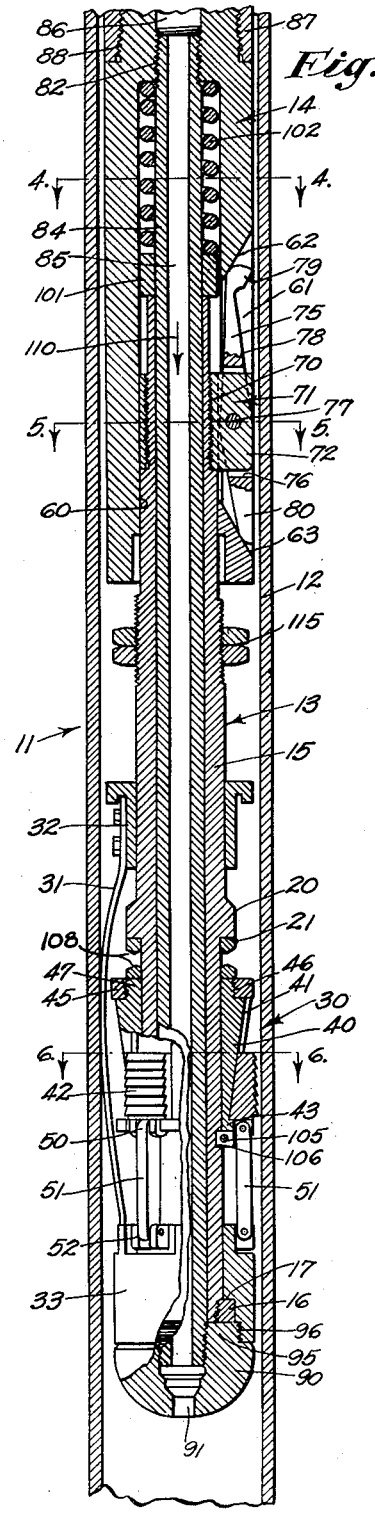

In the drawings I show my novel casing cutter, generally indicated by the numeral 11, positioned within a tubular member 12, which may be a casing of a well. The casing cutter comprises a cutter carrying body which, for convenience of description, I will refer to as a sleeve or primary body 13, and a secondary body 14 which supports the primary body 13 and is axially slidable relative thereto.

The primary body 13 is formed of a tubular member 15 having a nut 16 threaded on a lower end thereof for the purpose of providing a thrust shoulder 17. At an intermediate point upon the body 13 is formed an enlargement 20 providing a shoulder 21.

Slidably mounted on the body 13 between the nut 16 and the enlargement 20 is the locking means of the invention, which is generally designated by the numeral 30. The locking means 30 is of somewhat conventional design and consists of a plurality of belly springs 31 extending from an upper spring follower 32, which is slidably mounted on the body 13 above the enlargement 20, to a lower spring follower 33 slidably mounted on the body 13 adjacent the nut 16. The belly springs 31 are adapted to frictionally engage the wall of the tubular member 12 as shown in the drawings. Positioned on the body 13 directly below the enlargement 20 and slidable longitudinally relative to the body 13, is a slip body 40. This slip body 40 provides a plurality of longitudinally extending dove-tail grooves 41 for the accommodation of slip members 42. The grooves 41 extend convergently downward from the upper end of the body 40 in an oblique plane relative to the longitudinal axis of the body 13 and end at a stop shoulder 43 formed at the lower end of the body 40. The grooves 41 are closed at their upper ends by a nut 45 engaging threads 46 provided on a reduced diameter portion 47 at the upper end of the body 40. The slip members 42 are freely slidable longitudinally in the grooves 41 between the shoulder 43 and the nut 45. Pivotally connected to the bottom of each of the slip members 42, as shown at 50 in the drawings, is a slip link 51. Likewise the lower end of each of the links 51 is pivotally connected to the lower spring follower, as shown at 52.

Figure 11:
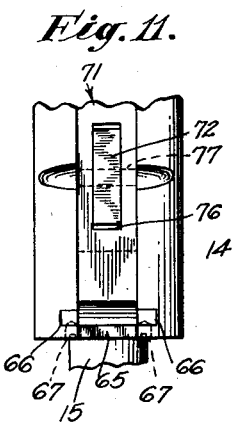
Fig. 11 is a fragmentary elevational view taken as indicated by the arrow 11 of Fig. 2, and showing an insert member included in the cutter operating cam means of the invention.
Figure 4:
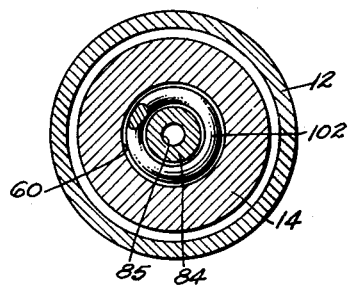
Figure 5:
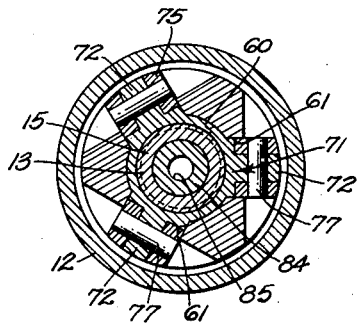
Figure 6:
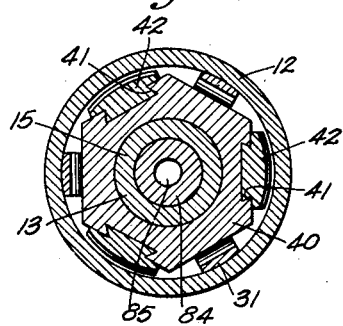

Coming now to the novel features of my invention, I provide a bore 60 in the secondary body 14 into which the upper end of the primary body 13 extends. Provided in the walls of the body 14, in communication with the bore 60, are a plurality of equally spaced, longitudinally extending openings 61. The upper wall 62 and the lower wall 63 of each of the openings 61 are formed so as to embody the cutter operating cam surfaces of the invention, the upper wall 62 sloping obliquely upward and outward from a point coincident to the bore 60, and the lower wall 63 sloping obliquely downward and outward from a point coincident with the bore 60. The wall 63 forming the lower cam surface is not integral with the body 14 but for purpose of assembly is made in the form of an insert 65 having a tongue and groove engagement with the body 14, as shown at 66 in Fig. 11. Set screws 67 may be provided for the retention of the insert 65, as also shown in Fig. 11.

Secured to the upper end of the primary body 13, as by threads 70, is a cutter-carrying bracket member 71, which is adapted to be positioned within the bore 60 and is provided with a plurality of lugs 72 which project outwardly into each of the openings 61.

Positioned in each of the openings 61 is a cutter member 75, which conforms in width to the opening 61 and is provided with a slot 76 for the reception of one of the lugs 72. Each of the cutters 75 is pivotally mounted on one of the lugs 72 by pins 77 in such a manner that the upwardly extending ends 78 upon which are formed cutting blades 79 frictionally engage the upper cam surfaces 62, and the downwardly extending ends 80 of the cutters 75 frictionally engage the lower cam surfaces 63 of the secondary body 14.

Rigidly connected to the body 14 at the upper end of the bore 60, as by threads 82 is a bearing shaft 84 which extends downwardly through the tubular body 15. The shaft 84 is in the form of a tube and provides a fluid passage 85 throughout the length thereof, which is in direct communication with a fluid opening 86 in the upper end of the secondary body 14. The opening 86 in turn communicates with the fluid passage provided in a supporting string of drill tubing (not shown) which is connected to the secondary body 14 by a coupling or tool joint 87 as by threads 88.

Threaded to the lower end of the bearing shaft 84 below the lower end of the primary body 13 is a locking nut 90 provided with a fluid opening 91 communicating with the passage 85 for the passage of a fluid lubricant therethrough. The upper end of the nut is provided with a reduced diameter portion 95 having external threads 96 formed thereon. The threads 96 are adapted to engage internal threads 97 formed in a counterbore 100 provided in the lower face of the lower spring follower 33.

Surrounding the shaft 84 within the bore 60 in engagement with the upper end of the body 13 is a slidable spring abutment 101. Positioned in the bore 60 and encircling the shaft 84 is a compression spring 102 confined between the upper end wall of the bore 60 and the spring abutment 101 as shown in the drawings.

Figure 7:
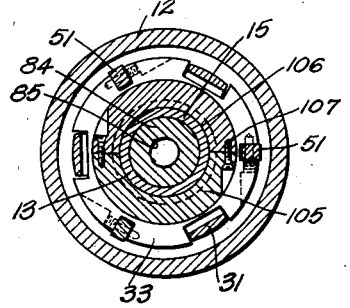
Fig. 7 is a sectional view taken as indicated by the line 7—7 of Fig. 2.

Secured to the primary body 13 below the slip body 40, and suitably spaced from the enlargement 20 of the body 13 is a slip operating ring 105. For convenience of mounting, the ring 105 may be split as shown in Fig. 7 and secured in an annular groove 106 formed in the body 13 as by set screws 107.

The operation of my invention is as follows. When it is desired to cut a well casing within a well the working parts of my casing cutter are positioned as shown in Fig. 1. In this position the relative positions of the primary and secondary bodies is such that the cutting members 75 lie in a retracted position with the blades 79 thereof entirely within the openings 61. It will be noted that at this time the nut 16 upon the lower end of the primary body 13 is drawn upward within the counterbore 100 and that nut 90 is engaging the threads 96, thereby locking the primary and secondary bodies 13 and 14 against longitudinal movement relative to the locking mechanism 30.

It will be noted also in Fig. 1 that the slip body 40 is in its uppermost position and that the slips 42 are in a retracted position in the lower ends of grooves 41.

With the working parts of the casing cutter in the inoperative positions just described, the device is lowered into a well until the point is reached where it is desired to sever the well casing, whereupon the secondary body is rotated, against the frictional engagement between the belly springs 31 and the walls of the casing 12, so as to unscrew the nut 90 from engagement with the threads 96.

A downward force is then imparted to the secondary body 14 sufficient to move the primary and secondary bodies 13 and 14 in the direction of the arrow 110 of Fig. 1. Due to the action of the spring 102 no relative movement between the primary and secondary bodies 13 and 14 occurs at this time. As the body 13 moves downwardly relative to the locking mechanism 30 the enlargement 20 encounters the upper surface of the slip body 40 and forces it downwardly relative to the slips 42 and the spring followers 32 and 33 which are held against movement within the casing 12 by the belly springs 31. It will be seen that as the slip body 40 is moved downwardly the slips 42 will be forced laterally outward to engage the wall of the casing 12, at which time the working parts of the casing cutter will have assumed the relative positions shown in Fig. 2.

Figure 2:
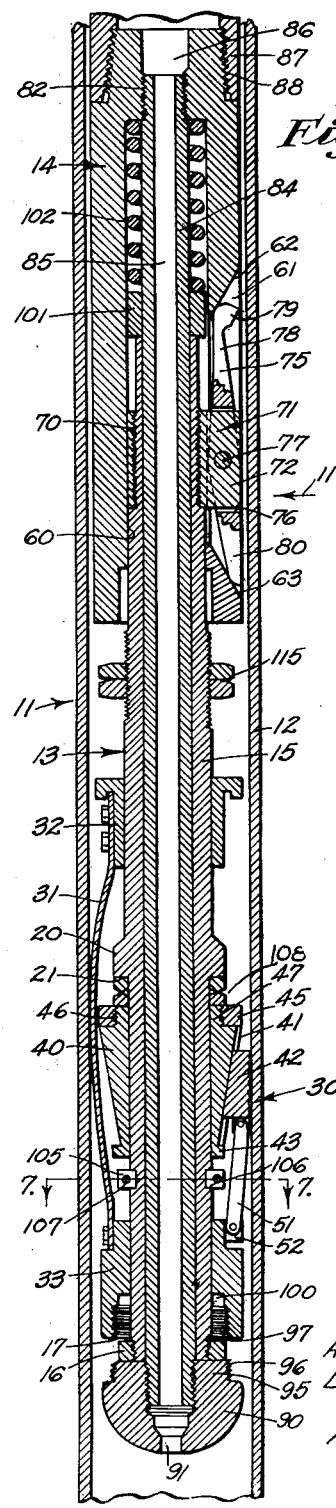

Additional force imparted to the body 14 in the direction of the arrow 110 after the slips 42 have engaged the casing 12 will overcome the action of the spring 102 and permit the secondary body 14 to move downwardly relative to the primary body 13. When this occurs it will be seen that the upper cam surface 62 will force the upper ends 78 of the cutter members 75 laterally outward until the blades 79 contact the wall of the casing in a working position. The secondary body 14 is then rotated by suitable means at the surface of the ground, imparting rotation to the primary body 13 through the cutter members, which engage the side walls forming the openings 61, and act as keys to drive the body 13. This rotation causes the cutter members 75 to revolve around the longitudinal axis of the bodies 13 and 14 in such a manner that the blades 79 cut the wall of the casing. During the cutting operation sufficient force is imparted downwardly upon the body 14 to cause the cam surfaces 62 to "feed" the blades 79 through the wall of the casing 12 until the casing is entirely severed as shown in Fig. 3, at which time the working parts of the device will have assumed the relative positions shown in Fig. 3. For the purpose of taking the thrust between the shoulder 21 of the enlargement 20 and the upper surface of the slip body 40 during the rotation of the cutters I provide a pair of hardened wear-resisting annular race rings 108 encircling the body 13 as shown in Figs. 1, 2, and 3.

The outward movement of the blades 79 is limited by an abutment provided upon the primary body 13 to limit the downward movement of the secondary body 14 relative thereto. The abutment may comprise a pair of lock nuts 115 threaded upon the primary body 13 as indicated in the drawings. It will be seen that by changing the position of the nuts relative to the body 14 the travel of the blades 79 may be varied for casings of different thickness.

When a casing 12 has been completely severed as shown in Fig. 3 the rotation of the cutters is discontinued and the body 14 is drawn upward relative to the body 13, in the direction of the arrow 120 of Fig. 3. When this occurs it will be seen that the lower cam surfaces 63 will force the lower ends 81 of the cutter members 75 outwardly, causing the cutter members 75 to pivot on the pins 77 in such a manner that the blades 79 move inwardly into their retracted positions shown, at which time the nut 90 is engaging the lower end of the body 13 as shown in Fig. 2.

Additional upward movement will cause the body 13 to be raised relative to the locking mechanism 30 until the split ring 105 engages the bottom of the slip body 40, moving it upwardly relative to the slips 42, whereupon the slips 42 are drawn inwardly into the retacted position shown in Fig. 1. The body 14 is then raised sufficiently relative to the locking mechanism 30 so that the nut 16 enters the counterbore 100, and the external threads 96 engage the internal threads 97, so that a rotation of the secondary body 14 will cause the threads 96 and 97 to be screwed together into the position shown in Fig. 1. The casing cutter may then be raised from the well or to another desired point in the well and the above described operation repeated to make an additional cut in the casing 12.

Figure 10:
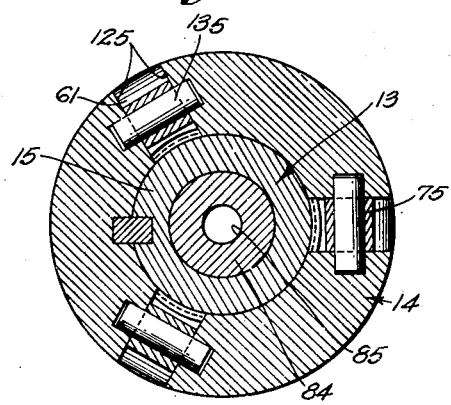
Fig. 10 is a sectional view taken as indicated by the line 10—10 of Fig. 9.

In Figs. 8 and 9 and 10 I have illustrated an alternative form of my invention in which I have designated corresponding parts with similar characters. The secondary body 14 has an axial bore 60 into which the upper end of the primary body 13 extends in slidable relationship therewith. Formed in the wall of the secondary body 14 are a plurality of openings 61 which are in the form of slots extending upwardly from the bottom of the secondary body 14, the walls forming the upper ends of the openings 61 sloping obliquely upward and outward to form cam surfaces 62. Formed in the side walls 125 of each of the openings 61 are guide grooves 126.

Secured to the primary body 13 below the secondary body 14 as by threads 127 is a cutter-supporting bracket 128. Pivotally secured to the bracket 128 in the manner shown at 130 in Figs. 8 and 9 are a plurality of cutter members 75 which extend upwardly from the pivot points 130 into the slots 61 in frictional engagement with the cam surfaces 62. Formed upon the upper ends of the cutters 75 are blades 79 adapted to engage and cut a well casing when the cutters 75 are in a working position. Extending laterally through the bodies of each of the cutters 75 at an intermediate point between the blade 79 and the pivot 130 is a guide pin 135. The pin 135 extends outward on either side of the cutter sufficiently to engage the guide grooves 126, in slidable relationship therewith.

The operation of this form of my invention is as follows. Assuming that the primary body 13 is equipped with a locking mechanism identical with the mechanism 30 described in connection with the form shown in Figs. 1 to 7, the casing cutter is lowered into a well with the working parts in the inoperative positions shown in Figs. 1 and 10. When the desired position has been reached the body 14 may be rotated to release the retaining nut 90 and the body 14 lowered to actuate the slips 42 to engage the casing as previously described.

It will be seen from an inspection of Figs. 8 and 9 that an additional downward movement of the secondary body 14 after the primary body 13 has been locked against longitudinal movement relative to the casing 12 will cause the cam surfaces 62 to force the cutters 75 outward into engagement with the casing 12, whereupon the secondary body 14 is caused to rotate to revolve the cutters 75 to cut the casing as described in the preferred form. When the cutters 75 assume the position shown in Fig. 8 the casing 12 will have been entirely severed.

It will be understood that an upward movement of the secondary body 14 relative to the primary body 13 will cause each cutter 75 to pivot at the point 130 and move out of engagement with the casing 12, into the retracted position shown in Fig. 9, through the action of the guide pins 135 sliding in the guide grooves 126. The working parts of the device may then be locked in their respective inoperative positions, as previously described in connection with the preferred form of my invention.

Although I have herein shown and described a preferred and an alternative form of my invention it should be understood that I do not wish to limit my invention to the details of construction as disclosed, for I am aware that various features thereof might be changed and numerous embodiments thereof might be devised by those skilled in the art, without departing from the spirit and scope of my invention.

I claim as my invention:

1. In a rotary casing cutter: a body having a depending shaft; a knife guide having a sleeve slidably mounted over said shaft for limited longitudinal movement; a slip mechanism for causing sliding of said sleeve and guide, said slip mechanism comprising a slip actuator including spaced spring followers slidably mounted on said sleeve, bowed springs connecting said followers;

a slip body slidable on said sleeve and disposed intermediate the followers, there being an abutment on said sleeve for engagement by said slip body in its upward movement; slips riding on said slip body and coupled to said actuator; and releasable means for holding said actuator against longitudinal movement.

2. In a rotary casing cutter: a body having a depending shaft; a knife guide having a sleeve slidably mounted over said shaft for limited longitudinal movement; a slip mechanism for causing sliding of said sleeve and guide, said slip mechanism comprising a slip actuator including spaced spring followers slidably mounted on said sleeve, bowed springs connecting said followers; a slip body slidable on said sleeve and disposed intermediate the followers, there being an abutment on said sleeve for engagement by said slip body in its upward movement; slips riding on said slip body and coupled to one of said followers; and releasable means for holding said actuator against longitudinal movement.

3. In a rotary casing cutter: a body having a depending shaft; a knife guide having a sleeve slidably mounted over said shaft for limited longitudinal movement; a slip mechanism for causing sliding of said sleeve and guide; a release nut at the foot of said shaft, said slip mechanism comprising spaced spring followers slidably mounted on said sleeve; bowed springs connecting said followers; a slip body slidable on said sleeve and disposed intermediate the followers, there being an abutment on said sleeve for engagement by said slip body in its upward movement; slips riding on said slip body; and link rods coupling said slips to the lower of said followers, the lower of said followers having threads for engagement with the threads of said release nut.

4. In a rotary casing cutter: a body having a depending shaft; a knife guide having a sleeve slidably mounted over said shaft for limited longitudinal movement; and a slip mechanism for causing sliding of said sleeve and guide, said slip mechanism comprising a slip actuator including spaced spring followers slidably mounted on said sleeve, bowed springs connecting said followers, a slip body disposed on said sleeve intermediate said followers, slips riding on said slip body and coupled to said actuator, and releasable means for holding said actuator against longitudinal movement.

5. In a rotary casing cutter: a body having a depending shaft; a knife guide having a sleeve slidably mounted over said shaft for limited longitudinal movement; and a slip mechanism for causing sliding of said sleeve and guide, said slip mechanism comprising a slip actuator including spaced spring followers slidably mounted on said sleeve, bowed springs connecting said followers, a slip body disposed on said sleeve intermediate said followers, slips riding on said slip body and coupled to one of said followers, and releasable means for holding said actuator against longitudinal movement.

6. In a rotary casing cutter: a body having a depending shaft; a knife guide having a sleeve slidably mounted over said shaft for limited longitudinal movement; a slip mechanism for causing sliding of said sleeve and guide; and a release nut at the foot of said shaft, said slip mechanism comprising spaced spring followers slidably mounted on said sleeve, bowed springs connecting said followers, a slip body disposed on said sleeve intermediate said followers, slips riding on said slip body, and link rods coupling said slips to the lower of said followers, the lower of said followers having threads for engagement with the threads of said release nut.

7. In a casing cutter of the character described for use within a tubular member: a body having a depending shaft; a sleeve non-rotatably mounted and adapted for limited longitudinal movement on said shaft; a cutter mounted on said sleeve for outward movement, there being means on said sleeve guiding said cutter in its outward movement; slip means rotatably mounted on said sleeve for locking said sleeve to said tubular member; means slidable relative to said sleeve for actuating said slip means; and a cam connected to said shaft in position to force said cutter outwardly when said shaft is moved within said sleeve after said slip means is in engagement with said tubular member to hold said sleeve stationary.

8. In a casing cutter of the character described for use within a tubular member: a body having a depending shaft; a sleeve non-rotatably mounted and adapted for limited longitudinal movement on said shaft; a cutter mounted on said sleeve for outward movement, there being means on said sleeve guiding said cutter in its outward movement; slip means rotatably mounted on said sleeve and frictionally engaging said tubular member, for locking said sleeve to said tubular member; means slidable relative to said sleeve for actuating said slip means; releasable means for holding said actuating means in inoperative condition; and a cam connected to said shaft in position to force said cutter outwardly when said shaft is moved within said sleeve after said slip means is in engagement with said tubular member to hold said sleeve stationary.

9. In a casing cutter of the character described for use within a tubular member: a body having a depending shaft; a sleeve non-rotatably mounted and adapted for limited longitudinal movement on said shaft; a cutter mounted on said sleeve for outward movement, there being means on said sleeve guiding said cutter in its outward movement; slip means rotatably mounted on said sleeve and frictionally engaging said tubular member, for locking said sleeve to said tubular member; means slidable relative to said sleeve for actuating said slip means; releasable means for holding said actuating means in inoperative condition and for holding said sleeve stationary on said shaft; and a cam connected to said shaft in position to force said cutter outwardly when said shaft is moved within said sleeve after said slip means is in engagement with said tubular member to hold said sleeve stationary.

10. In a casing cutter of the character described for use within a tubular member: a body having a depending shaft; a sleeve non-rotatably mounted and adapted for limited longitudinal movement on said shaft; a pivot pin on said sleeve; a cutter pivotally retained on said pivot pin, for outward movement into cutting engagement with said tubular member; slip means rotatably mounted on said sleeve for locking said sleeve to said tubular member; means slidable relative to said sleeve for actuating said slip means; and a cam connected to said shaft in position to force said cutter outwardly when said shaft is moved within said sleeve after said slip means is in engagement with said tubular member to hold said sleeve stationary.

11. In a casing cutter of the character described for use within a tubular member: a body having a depending shaft; a sleeve non-rotatably mounted and adapted for limited longitudinal movement on said shaft; a pivot pin on said sleeve; a cutter pivotally retained on said pivot pin, for outward movement into cutting engagement with said tubular member; slip means rotatably mounted on said sleeve and frictionally engaging said tubular member, for locking said sleeve to said tubular member; means slidable relative to said sleeve for actuating said slip means; releasable means for holding said actuating means in inoperative condition and for holding said sleeve stationary on said shaft; and a cam connected to said shaft in position to force said cutter outwardly when said shaft is moved within said sleeve after said slip means is in engagement with said tubular member to hold said sleeve stationary.

12. In a casing cutter of the character described for use within a tubular member: a body having a depending shaft; a sleeve slidable for limited longitudinal movement on said shaft; a cutter mounted on said sleeve for outward movement, there being means on said sleeve guiding said cutter in its outward movement; slip means on said sleeve for locking said sleeve to said tubular member; means slidable relative to said sleeve for actuating said slip means; a cam connected to said shaft in position to force said cutter outwardly when said shaft is moved within said sleeve after said slip means is in engagement with said tubular member to hold said sleeve stationary; and adjustable means cooperative with said sleeve and said body for determining the movement of said cam relative to said cutter.

13. A casing cutter of the character described for use within a tubular member, including: a body adapted to extend within said tubular member; a cutter mounted on said body for outward movement into cutting engagement with said tubular member, there being means connected to said body for positively guiding said cutter in its outward movement; locking means for engaging said tubular member to secure said body stationary within said tubular member; means rotatably mounted on and having limited sliding movement relative to said body for actuating said locking means; a support for said body, said support being adapted to be secured to a pipe string, and said support having limited movement relative to said body and being provided with a cam adapted to force said cutter outwardly when moved relative to said body; and releasable means adapted to hold said actuating means in inactive position and stationary relative to said body.

14. A casing cutter of the character described for use within a tubular member, including: a body adapted to extend within said tubular member; a cutter mounted on said body for outward movement into cutting engagement with said tubular member, there being means connected to said body for positively guiding said cutter in its outward movement; locking means for engaging said tubular member to secure said body stationary within said tubular member; means rotatably mounted on and having limited sliding movement relative to said body for actuating said locking means; a support for said body, said support being adapted to be secured to a pipe string, and said support having limited movement relative to said body and being provided with a cam adapted to force said cutter outwardly when moved relative to said body; and means operable in response to rotation of said support for holding said actuating means in inactive position and stationary relative to said body.

ARTHUR E. MARTOIS.